Nov. 21, 1933.  W. B. SKONIECZNY  1,936,121
AIR INLET BLOWER FOR DIESEL ENGINES
Filed Dec. 23, 1930   3 Sheets-Sheet 1

Inventor
William B. Skonieczny
By Watson, Coit, Morse & Grindle
Attorneys

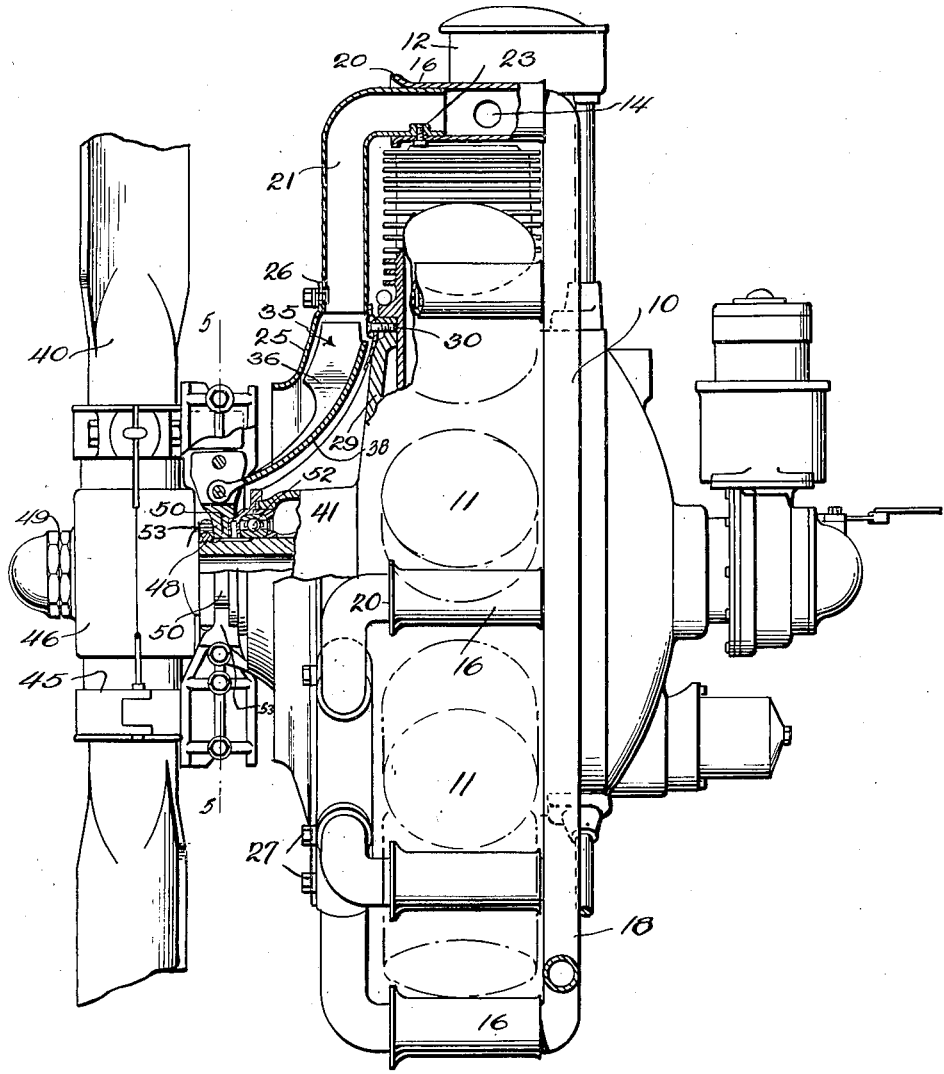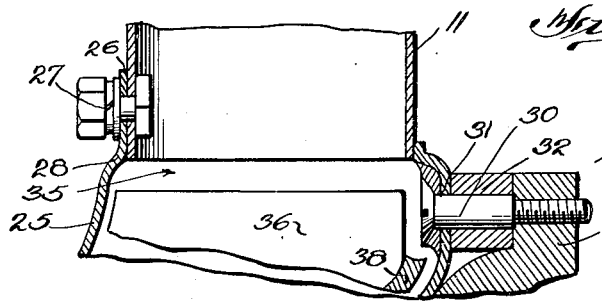

Nov. 21, 1933.   W. B. SKONIECZNY   1,936,121
AIR INLET BLOWER FOR DIESEL ENGINES
Filed Dec. 23, 1930   3 Sheets-Sheet 3

Inventor
William B. Skonieczny,
By Watson, Coit, Morse & Grindle
Attorneys

Patented Nov. 21, 1933

1,936,121

UNITED STATES PATENT OFFICE 1,936,121

AIR INLET BLOWER FOR DIESEL ENGINES

William B. Skonieczny, Detroit, Mich., assignor to Packard Motor Car Company, Detroit, Mich., a corporation of Michigan Application December 23, 1930
Serial No. 504,353

4 Claims. (Cl. 60—32)

This invention relates to internal combustion engines of the Diesel type and more particularly to Diesel engines adapted for the propulsion of aircraft in which the air which supports combustion within the engine cylinders and the gaseous products of such combustion enter and leave each cylinder through a single port therein.

In the use of this type of engine in aircraft, it has hitherto been proposed to utilize the current of air directed rearwardly by the propeller to remove the freshly ejected products of combustion from the vicinity of the cylinder port and supply fresh air for the new charge, the operation being improved by the provision of separate conduits directed rearwardly of the engine and open at their forward ends, one such conduit communicating intermediate the ends thereof with each cylinder port, and the rear ends of the conduits being connected to an exhaust manifold. It has been found, however, that in spite of the currents of air passing through these conduits by reason of their disposition in the wake of the propeller, portions of the exhaust gases are ejected from the forward ends of the conduits and the smoke and accompanying noise of exhaust are disagreeable to pilot and passenger.

It is therefore an object of the invention to provide means for causing continuous circulation of air in one direction past the cylinder ports of an engine of the type described to ensure immediate removal of exhaust gases issuing from the ports.

A more specific object of the invention is the provision in an aircraft propelled by a Diesel engine of means connected to the aircraft propeller but acting independently thereof to direct a stream of air rearwardly through the conduits which communicate with the cylinder ports of the engine to prevent the issuance of exhaust gas from the forward ends of the conduits.

Further objects of the invention will be apparent from the following description taken in connection with the accompanying drawings, in which Figure 1 is an end elevation of a Diesel engine designed for use in aircraft to which the present invention has been applied;

Figure 3 is a side elevation of the engine shown in Figure 1, parts of the engine being broken away;

Figure 4 is an enlarged fragmentary sectional view of details shown in Figure 3;

Figures 1, 2:
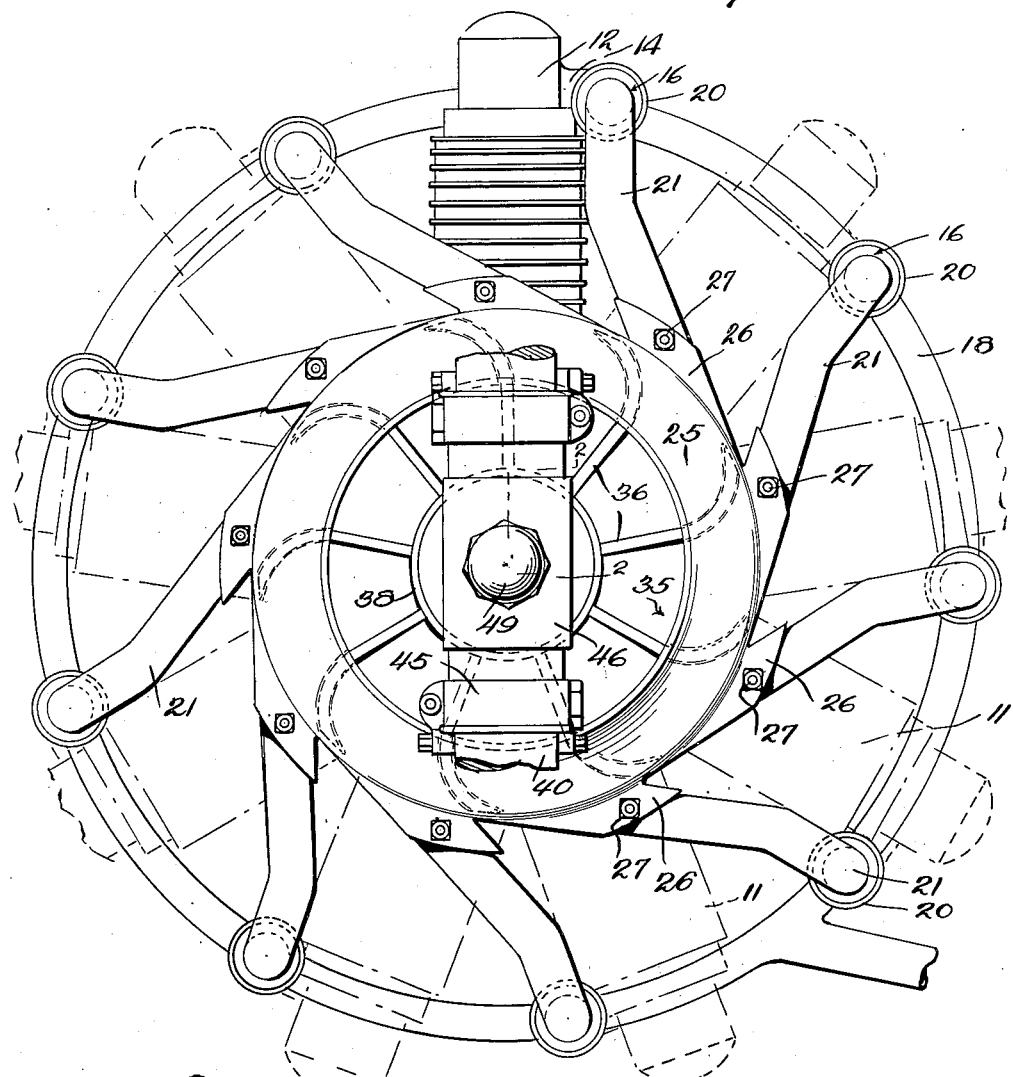
Figure 2 is a fragmentary sectional view on the line 2—2 of Figure 1.

Referring now specifically to the drawings it will be observed that the reference numeral 10 indicates the crank case of a Diesel engine of the well known radial type on which are mounted a number of radially disposed cylinders 11. Each of the cylinders 11 is provided with a head 12 having an air inlet and exhaust port 14 in one side thereof, this port being controlled in the usual manner by a valve (not shown) operating within the head. Secured in any suitable manner to each cylinder head 12 or formed integrally therewith is a conduit 16, each conduit being provided with an opening intermediate the ends thereof communicating with the port 14. These conduits 16 communicate at their rear ends with an exhaust manifold 18 and are preferably flared at their forward ends as shown at 20.

The arrangement thus far described has been in practical use on aircraft and operates satisfactorily with the exception that difficulty has been encountered by reason of the issuance of exhaust gas from the forward ends of the conduits 16 as mentioned hereinbefore. The manner in which the principles of the present invention may be applied to this well known arrangement will now be described.

A plurality of L-shaped air inlet pipes 21 are provided, one end of each of these pipes being fitted snugly within the flared portion 20 of the forward end of each conduit 16 as clearly shown in Figure 3 of the drawings. These air inlet pipes may be retained in position within the conduits 16 by any suitable means, for instance, by threaded fastening devices 23 projecting through the wall of each conduit and the exhaust pipe.

The other end of each air inlet pipe is directed inwardly of the engine and is connected at its inner end with a manifold 25. One way in which this connection may be effected is illustrated in Figures 1, 3, and 4 of the drawings in which the inlet pipes are shown as projecting within collars or sleeves 26 struck up from the openings in the manifold, bolts 27 being inserted through the inlet pipes and these struck up portions. The manifold is preferably secured to the end wall 29 of the crank case 10 by means of a plurality of bolts 30 passing through apertures 31 in the manifold and threaded within openings provided at spaced points about the periphery of the crank case end wall. A suitable spacing element 32 surrounds each bolt 30.

It will be noted from Figure 3 of the drawings that the manifold 25 is substantially U-shaped in cross-section to provide an annular chamber 35 open on its inner side and that a plurality of fan blades 36 extend within this chamber and are rotated about the axis of the crankshaft to cause a current of air to flow outwardly in the inlet pipes 21 and through the conduits 16. These blades are preferably curved as seen in the elevational view in Figure 1 of the drawings and are preferably formed on the outer surface of a substantially frusto-conical member 38 which comprises the body of the fan or blower. In the form of the invention shown in the drawings the blower is shown as secured to and driven from the mechanism which serves to connect an airplane propeller 40 to the crankshaft 41 of the engine and for that purpose is provided with a plurality of pairs of lugs 42 forming extensions of the smaller circumference or forward end of the member 38. It will be understood that the blower is preferably connected to and driven from the crankshaft but in the application of the invention to an engine for use on aircraft the method of connecting the blower to the crankshaft described herein is found to be extremely convenient since it necessitates only a small change in a propeller assembly heretofore developed and extremely useful from a practical standpoint.

Figure 5:
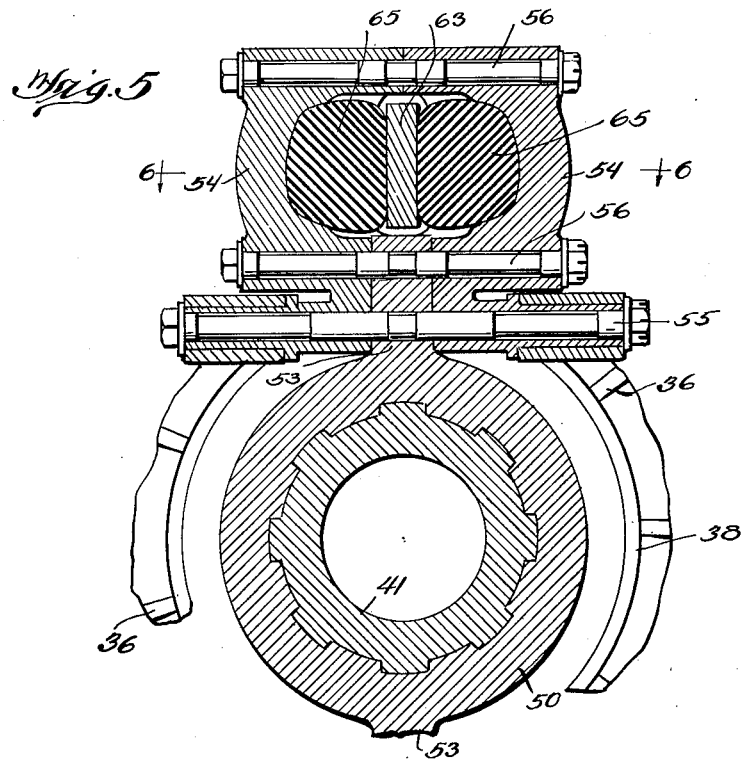
Figure 5 is an enlarged detailed partial section taken substantially on the line 5—5 of Figure 3.
Figure 6:
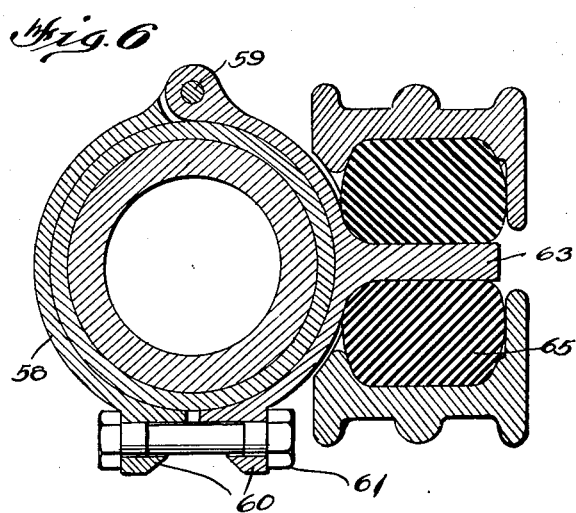
Figure 6 is an enlarged detailed section taken on the line 6—6 of Figure 5.

The propeller assembly in question has been designed with a view to cushioning and relieving stresses and damping torsional disturbance in airplane crankshafts and contemplates the introduction into the assembly of sufficient resilience to effectively cushion the direct shock loads. The critical speeds of the shaft are thereby transferred to a lower position in the engine speed range and such induced disturbances as may appear are effectively damped in order to prevent the resonant growth thereof. For this purpose the oppositely disposed blades 40 of the propeller are secured in sockets 45 of a hub 46 in any suitable manner, not shown in the drawings. The hub 46 is journalled on an extension of the crankshaft 41 and is axially positioned thereon between a ring 48, threaded or otherwise suitably secured to the chankshaft 41, and a retaining member 49, for instance, a nut threaded on the extension of the crankshaft. The drive between the crankshaft and the propeller is effected by resilient driving means between the hub 46 and the crankshaft 41 which are illustrated in detail in Figures 5 and 6. This driving means comprises an annular driving member 50, splined or otherwise rigidly connected to the end of the crankshaft 41, and positioned axially of the shaft between the ring 48 and the inner race ring of the shaft bearing 52. This annular member is provided with oppositely disposed driving arms 53 to each of which is secured the halves of a two-part housing member 54, these parts being clamped together and to the arm 53 by suitable means such as bolts 55, the latter bolts also serving to clamp the lugs 42 to hold the blower body 38 in position and to drive the same as hereinafter described. The halves of the housing 54 are also rigidly clamped together by bolts 56 on either side thereof. Each of the propeller blade sockets 45 is embraced by a removable clamp band 58 formed in two parts, which are hinged together as shown at 59. The free ends of these parts are provided with lugs 60 which are adapted to be drawn together by a bolt 61 to clamp the band tightly on the socket 32. Integral with the band 58 is a driving lug 63 positioned to project into the housing 54 between the halves thereof. On either side of this lug 63 within the housing is a yieldable cushioning member 65 of any suitable resilient material, preferably rubber, which may be somewhat compressed between the housing portions 54.

It will be observed that the crankshaft torque is transmitted from the annular member 50 and its arms 53 to the housing 54, and thence through the resilient cushioning members 65 to the driving lug 63 of the clamp 58 on the propeller blade socket. As the propeller hub is thus journalled on the extension 41 of the crankshaft, it will be seen that this construction provides a propeller drive which is somewhat flexible, permitting the propeller hub to lag behind the crankshaft during periods of peak torque therein, while the resilient members 65 are compressed, and subsequently to advance to its normal position with respect to the shaft as the resilient members expand. Hence the connection is adapted to yield to the high shock torque so that the inertia stresses of accelerating the propellers are not imposed instantaneously on the shaft and the purpose of damping induced disturbances in the system and preventing the resonant growth thereof are thereby served.

Thus, the blower body 38 is rigidly connected to the drive for the propeller and rotates with the crankshaft so that air is drawn in along the propeller hub into the manifold 25 and is discharged rapidly by the moving blades 35 through the inlet pipes 21. Continuous circulation of air through the conduits 16 and past the respective cylinder ports is thereby ensured and discharge of exhaust gases at the front of the engine is prevented.

Under certain circumstances it is also possible to obtain supercharging of the engine by reason of the excess pressure developed in the conduits associated with the cylinder ports during operation of the blower. It will be appreciated that in spite of the rapidity of movement of the air within the conduits there is a certain amount of back pressure developed by reason of the connection of these conduits to the exhaust manifold and associated exhaust discharge pipes.

It will be understood that the invention is not necessarily limited to the details of construction illustrated and described herein. For instance, in the event that the engine is used for purposes other than the propulsion of aircraft the blower must necessarily be supported for rotation in some other manner. Such further alterations and modifications of the construction shown herein are contemplated as fall within the spirit and scope of the appended claims.

Having thus described the invention, what is claimed as new and desired to be secured by Letters Patent is:

1. In a Diesel engine for use in aircraft, having a crankshaft and a plurality of cylinders, each of said cylinders being provided with a port serving as an air inlet and an exhaust gas outlet, the combination with means for conducting air past said ports, of air propulsion means connected to said crankshaft, and a blower secured to said air propulsion means for directing air through said first named means.

2. In a Diesel engine for use in aircraft, having a crankshaft and a plurality of cylinders, each of said cylinders being provided with a port serving as an air inlet and an exhaust gas outlet, the combination with means for conducting air past said ports, of a propeller mounted on said crankshaft, coupling means for connecting said propeller to said crankshaft for rotation therewith, and a blower driven from said coupling means for directing air through said first named means.

3. In a Diesel engine for use in aircraft, having a crankshaft and a plurality of cylinders, each of said cylinders being provided with a port serving as an air inlet and an exhaust gas outlet, the combination with a plurality of conduits, one such conduit communicating with each of said ports and extending transversely thereof, of means for causing a continuous flow of air through each conduit and past the corresponding cylinder port, whereby issuance of exhaust gases from one end only of said conduit and entry of fresh air through the opposite end only of said conduit is ensured, said means including a manifold associated with said conduits, a blower associated with said manifold, a propeller, and means for connecting said propeller to said crankshaft, said blower being secured to said last named means.

4. In a Diesel engine for use in aircraft, having a crankshaft and a plurality of cylinders, each of said cylinders being provided with a port serving as an air inlet and an exhaust gas outlet, the combination with a plurality of conduits, one such conduit communicating with each of said ports and extending transversely thereof, of means for causing a continuous flow of air through each conduit and past the corresponding cylinder port, whereby issuance of exhaust gases from one end only of said conduit and entry of fresh air through the opposite end only of said conduit is ensured, said means including a manifold associated with said conduits, air propulsion means secured to said crankshaft, and a blower associated with said manifold and rotatable with said air propulsion means.

WILLIAM B. SKONIECZNY.